(No Model.) 3 Sheets—Sheet 3.
S. M. STEVENS & G. A. HARVEY.
CORN HARVESTER.
No. 411,268. Patented Sept. 17, 1889.
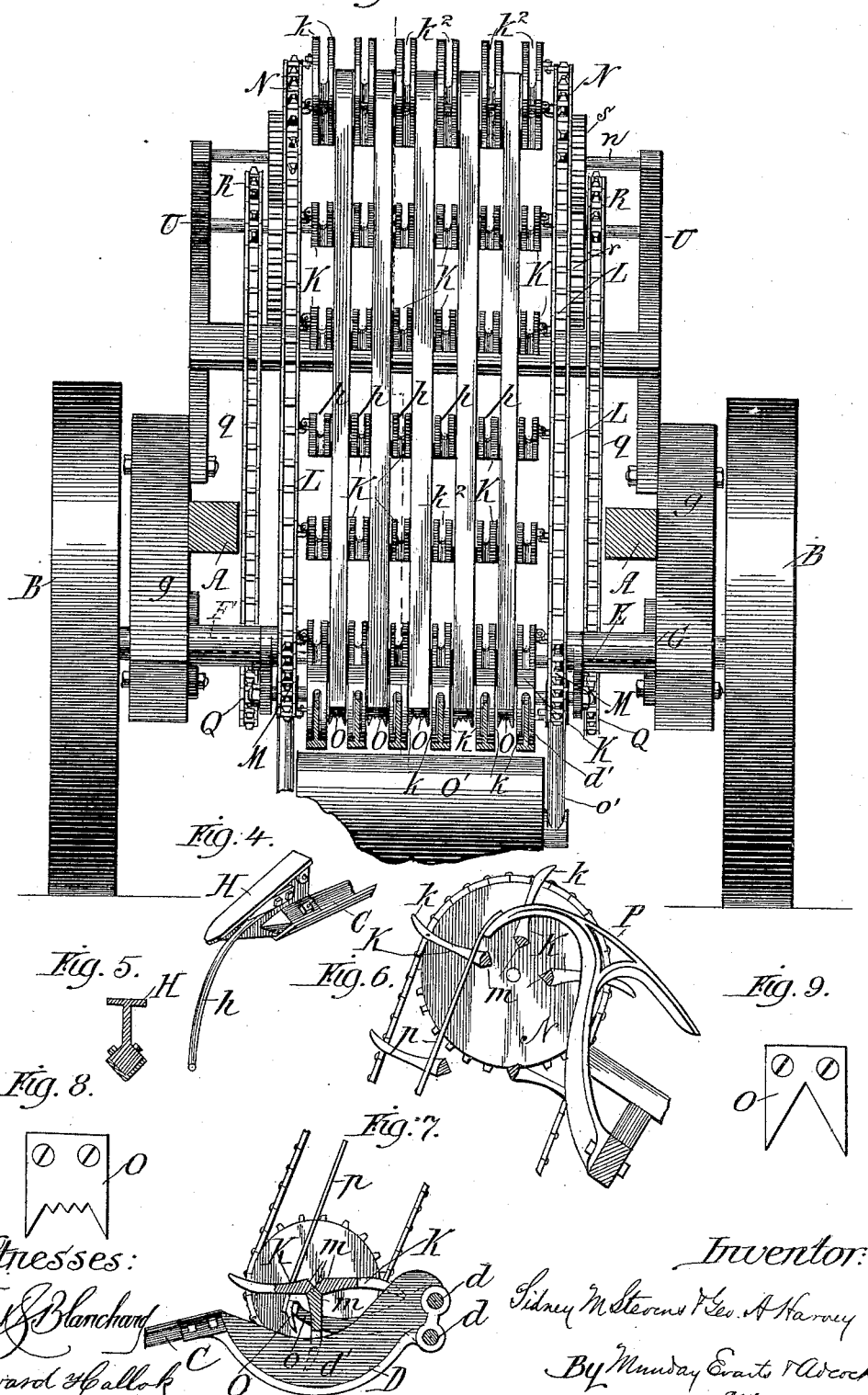

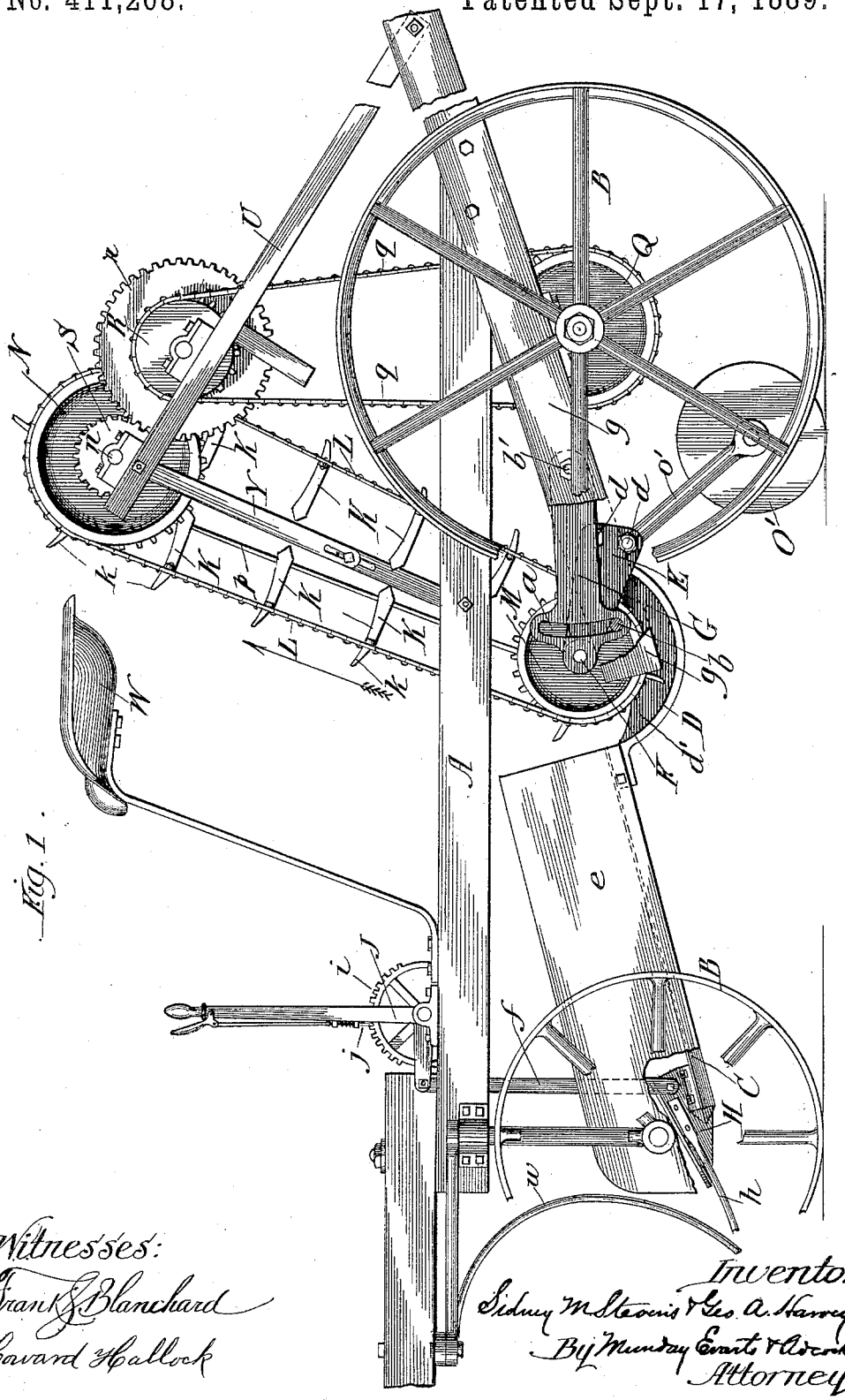

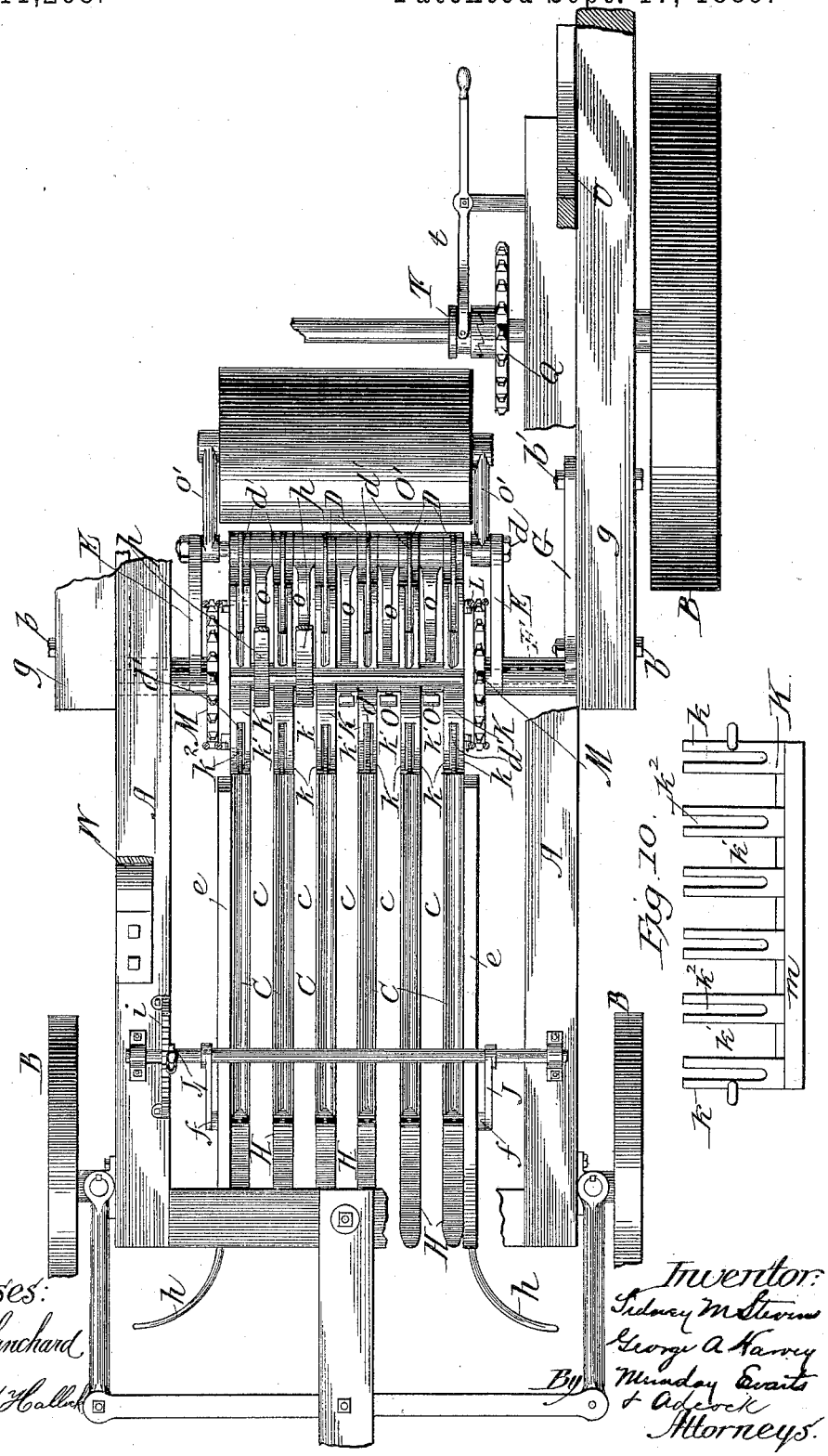

UNITED STATES PATENT OFFICE.

SIDNEY M. STEVENS AND GEORGE A. HARVEY, OF DE KALB, ILLINOIS.

CORN-HARVESTER.

SPECIFICATION forming part of Letters Patent No. 411,268, dated September 17, 1889.

Application filed October 26, 1886. Serial No. 217,212. (No model.)

*To all whom it may concern:*

Be it known that we, SIDNEY M. STEVENS and GEORGE A. HARVEY, citizens of the United States, residing in De Kalb, in the county of De Kalb and State of Illinois, have invented a new and useful Improvement in Corn-Harvesters, of which the following is a specification.

In this invention we have endeavored to produce a machine by which the corn may be gathered in the field from standing stalks without uprooting or cutting down the latter.

The invention consists in the novel combinations of parts and construction hereinafter set forth and claimed.

In the accompanying drawings, which form a part of this specification, and in which similar letters of reference indicate like parts, Figure 1 is a side elevation of our improved corn-harvester. Fig. 2 is a sectional plan of the same, parts being broken away. Fig. 3 is a front view of the elevator, the machine being in transverse section. Fig. 4 is a perspective of the end of the front guide-arms. Fig. 5 is a transverse section of the same. Fig. 6 is a sectional detached view of the head of the elevator, and Fig. 7 a like view of the bottom thereof. Figs. 8 and 9 are detached and enlarged views of the knives, and Fig. 10 is an enlarged view of one of the picker-heads detached.

In said drawings, A represents a suitable frame mounted upon wheels B B, the forward pair of which should be provided with an arched axle. Adjustably supported from the front of the frame is a series of forwardly-projecting arms C, arranged closely together and parallel, the channels or interspaces $c$ being of sufficient width to admit the corn-stalks. These arms are preferably formed of angle-iron, and are supported at their rear ends only, with the exception of the two outside ones. Each of them is bolted to a curved connection D, and these connections are supported by means of two cross-bolts $d$ from castings E at either side of the machine pivotally held on the stud-shafts F F, which are journaled in the arms G, adjustably and pivotally secured to the downwardly-inclined beams $g$, rigidly attached to the frame A in any suitable manner. The arms G are slotted, as shown at $a$, and held by the bolts $b$, passing through such slots, and pivotal bolts $b'$. At their front ends the arms C are provided with upper T-iron caps H, resembling in shape an inverted flat-iron. These caps may be bolted to the arms, as illustrated in Fig. 5. The arms are intended to be lowered in close proximity to the ground, so that they will pass under the down and reclining stalks and lift them up into position to be operated upon, the stalks entering some one of the interspaces $c$ and continuing therein until the machine has stripped off the corn-ears and left the stalks in its wake. At either side gathering-arms $h$ may be attached, and also side boards $e$. An adjusting device consisting of the bell-crank lever J, its pawl $j$, segment $i$, and connecting-bar $f$ may be mounted upon the frame and secured to the side boards and employed to raise and lower the front of the arms C to put them into position for work, to lift them entirely from the ground when moving the machine from place to place, or to change their height from the ground when the machine is at work. In these adjustments the arms C and their connections D turn upon the stub-axles, from which they are pivotally supported. The tops of the arms form a slotted platform, through which stalks are continually passing to the picking mechanism, and upon which any detached ears will be caught and along which they will be forced by the incoming stalks to the elevator. The flat-iron caps, it will also be noticed, form a sort of barrier adapted to prevent any such ears from sliding off in front of the platform. Their extreme points are low and their tops extend upward in an inclined direction to a point above the level of arms C. This insures the performance by said caps of the following very useful function: When an ear enters between the points of two adjacent caps, it is not allowed to proceed directly back in the channels $c$, where it might become lodged between the arms C, but instead it is caught by the laterally-projecting flanges of the caps and is compelled by those flanges to follow their upward inclination until it has passed beyond them. At this time, however, all danger of the ear getting into and choking any of the channels $c$ is passed, because it has been lifted entirely above them, so that if detached from its stalk it falls upon the upper surface of arms C and is carried to the elevator by the incoming corn following it, or, if not detached, it continues on in the usual course with its stalk until it is pulled off by the pickers. The tops of the caps also deflect such ears as ride over them and prevent their entering the channels between the guide-arms.

The cornstalks, which enter the machine through the spaces $c$, are conducted therethrough and directly to combing picker-heads or pickers, which move upward along the stalks, and are formed of castings K, extending from side to side, where they are secured to endless elevator-chains L. These pickers are provided with teeth $k$, between which are formed spaces $k'$, which are located in line with the spaces $c$ between the guide-arms. The teeth are also slotted, as at $k^2$, so that they will not interfere with the strengthening-ribs $d'$ upon the curved pieces D. Those portions of the pickers within the chains are shaped and of proper dimensions, as shown, so that when passing around the under wheels M upon stub-shafts F the edges of such inner portions $m$ will meet at the axial line of said wheels, and thus rigidly hold such one of the pickers as may at that moment be engaged in stripping off the corn from vibration. This will be understood from Fig. 7. The pickers are attached to the chains by ears so located, as shown, between the inner and outer ends of the channels between the teeth of the former that the pull exerted by the stripping operation will be received by the pickers in the plane of the chains as nearly as may be. If this strain were received by the pickers in a line outside of this plane, it would tip them—an evil which we thus avoid. It will also be noticed that the stripping occurs before the pickers have passed upward from wheels M, thereby enabling the wheels to stiffen the chain at the points of attachment. This feature also aids in enabling the pickers to do their work without yielding or tipping. At the top, the chains pass around wheels N upon shafts $n$. As the machine progresses the corn is bent over or thrown down in the direction of movement, and the ears are caught between some one of the pairs of picker-teeth, which, as the chain moves in the direction indicated by the arrow, approach the ears from the under side, and, in conjunction with the knife now to be described, comb them from the stalks.

O O are knives shaped in any of the forms shown, and located just above and within the lowest part of the path traveled by the picker-heads, there being one knife for each of the spaces $k'$—that is to say, one knife for each pair of picker-teeth. These knives are supported upon arms $o$, secured upon the cross-bolts $d$ between each pair of the curved pieces D, and are located in line with the channels $c$ and $k'$. The knives or knife-blades incline backward from the top slightly, so that when the picker-teeth seize the ear and pull it forward or upward one of the knives will be caused to engage and hold the stem of the ear or the stalk while the ear is stripped by the picker-teeth. The picker-teeth retain the ear and carry it up with them as they move upward to top of their line of travel, and from which upper point they discharge it to a proper receptacle or to the husking mechanism. The knife being thus inclined offers no resistance to the passage beneath it of the stalk; but the moment the pickers begin to carry the ear in the contrary direction it takes hold and operates to prevent the stalk from moving in the same direction. There is thus no danger of uprooting the plant. We have found in practice that these knives need not be sharp, but that if they possess only sufficient edge to insure their so detaining the stalk as to prevent the latter from yielding to the upward impulse of the pickers the ear will be torn from the stalk even without being severed by the knives, though perhaps more power will be consumed in the operation than when the knife is sharp. Indeed, devices very unlike knives may be used to detain the stalk and resist the pull of the strippers. Thus a roller O′, located to bear upon the lower part of the stalk, may be used with some advantage, especially when the ground is hard and the stalk is not easily uprooted.

At the top of the elevator, between the picker-teeth, are placed stationary cleaners P, which will clear the teeth of all accumulated husks and other litter. These are supported from the frame-work in any suitable manner. Straps $p$, of band-iron, are fastened to the cleaning-irons at one end and to the knife-support at the other, and as they fill the channels between the teeth they form a floor or back to the elevator, which will prevent the escape of the detached corn.

The curved pieces D and their ribs $d'$ perform an important additional function, as they help to keep the picker-heads clear of husks, stalk, ribbons, &c. They also guide and prevent the stalks from encroaching within the lines of travel of the picker-teeth, so that the latter do not strike or become entangled with the stalks at any time. They, together with the arms C, form continuous channels of uniform width, in which the stalks are confined from the time they enter the machine until they are left in its wake.

The picker-heads may be raised and lowered from the ground by changing the length of the adjustable brace Y, which, as shown, is made in two parts adjustable one upon the other, as clearly indicated in Fig. 1, and changing the position of the arms G to correspond. In all these adjustments the knives move with the other parts and maintain a fixed relation to the path of the picker-heads.

The elevator is operated from the main supporting-wheels by the sprocket-wheel Q on the axle, the chain $q$, the sprocket-wheel R, and the gear $r$, meshing with the pinion S on the shaft $n$. A clutch T, operated by the lever $t$, is used to put the elevator into and out of operation.

The upper wheels and driving-gear of the elevator are supported upon beams U, and these beams are at their forward ends connected to the frame by braces Y, and at their rear ends they are joined to beams $g$ by bolts, which permit the changes in their inclination rendered necessary in adjusting the elevator. The driver may ride on the seat W. It is also desirable to use horse-rake teeth $w$ at either side in front and just within the front wheels.

We have already referred to the roller O'. While the use of this device is entirely optional where the knives or other devices for detaining or holding the stalk against the pull of the pickers is employed, it may be used to advantage for another purpose than that specified—viz., to break down the stalks when such action is desired. We prefer that it should be a weighted roller and united to the harvester by rods $o'$, which will permit it to rise and fall to accommodate the unevenness of the ground.

It is desirable that the ears be not stripped off prior to their reaching the picker-heads, and hence where the ears grow near the ground it may be desirable to lower the heads to avoid their being caught in the platform-channels. So, also, it may be desirable at other times to raise the heads, so that they will not travel so near the ground. The elevator need not incline in the direction shown, but may be vertical or be inclined toward the front, though some slight modification of the picker-teeth might be requisite in the latter case.

It will be observed that the elevator permits the picker-heads to separate immediately after they have passed beyond the point where the stripping occurs and beyond contact with the stalk. This enables them to free themselves from ribbons, silk, &c., and other parts caught or torn off by them, so that with the aid of the cleaners the elevator and heads are kept free of material which might otherwise clog or wind upon the parts. It will be further noted that we have no rotating parts coming in contact with the stalks, and that the lower elevator-wheels are mounted upon separate stub shafts or axles instead of a continuous shaft or axle, and the operating mechanism is located at the side, where it does not come in contact with the corn. We believe we thus avoid a constant source of annoyance, as all such parts are apt to catch and wind up parts of the growth and frequently cause stoppage and breakage. A machine embodying rotating parts around which the growth could wind would be of doubtful practicability.

A further feature of value in our machine is found in the relative arrangement of the picker-heads and the stalk-guiding devices. The teeth of the former pass below the level of the latter, and the latter control the stalk until it has entered within the line of motion of the former. This insures the proper presentation of the corn to the heads, and at the same time prevents the stalks from getting into the direct path of the teeth and obstructing the operation of the machine.

We claim—

1. The combination, in a corn-harvester, of a series of guiding-arms adapted to present the stalks to the picking mechanism, a series of combing picker-heads striking the ears from below and stripping the stalks by an upward raking motion, and a series of stalk-detainers located in the channels between the guiding-arms and so that the teeth of the picker-heads pass astride thereof, substantially as specified.

2. The combination, in a corn-harvester, of the traveling toothed picker-head striking the ears from below and stripping the stalks by an upward raking motion, with a stationary knife or detaining device for engaging the stalk below the ear, and located, essentially as shown, so the teeth of the heads pass astride thereof, substantially as specified.

3. The combination, in a corn-harvester, of a series of picker-heads striking the ears from below and stripping the stalks by an upward raking motion, and a series of stationary knives or stalk-detainers, located, essentially as shown, so the teeth of the heads pass astride and below the level thereof, substantially as specified.

4. The traveling picker-heads adapted to engage the ears from below and to strip the stalks by an upward raking motion, in combination with stationary knives or stalk-detainers inclined backwardly and downwardly, substantially as specified.

5. In a corn-harvester, the combination, with the picking mechanism, of a series of stalk-guiding arms C, the points whereof are provided with inclined flat-iron-like caps, the flanges of such caps extending to a plane above that of the arms C, whereby ears entering the spaces between the caps are guided to the top of the arms and above the channels $c$ between them, substantially as specified.

6. In a corn-harvester, the elevator-chains and their carrying-wheels, in combination with picker-heads borne by said chains, said heads projecting inward from the plane of the chains, so that their interior edges meet as the chains pass around the lower elevator-wheels, substantially as and for the purpose set forth.

7. In a corn-harvester, a series of stalk-guiding arms, in combination with traveling picker-heads the teeth whereof are located at either side of the channels between said arms, the arms controlling the corn until it has entered within the line of motion of the heads, and the heads passing below the level of the arms, substantially as set forth.

8. In a corn-harvester, the cleaning-irons

P, the knives, and the strap-irons extending from the latter to the former, in combination with the elevator and its picker-heads, substantially as specified.

9. The combination of the arms C, curved connections D, cross-bolts $d$, side castings E, and shaft F, substantially as specified.

10. The combination of the arms C, curved connections D, cross-bolts $d$, side castings E, shaft F, and journal-castings G, substantially as specified.

11. In a corn-harvester, an elevator carrying a series of moving picker-heads and adjustable to and from the ground, in combination with guide-arms C and their curved connections, also adjustable, and the knives in fixed position relative to the elevator-path, substantially as set forth.

12. In a corn-harvester, an ear-picking elevator consisting of side chains carrying picker-heads extending from chain to chain and passing around lower wheels supported upon stub-axles, and having driving-wheels at the top, said elevator being placed transversely of the harvester, so as to receive the growth directly in its front, in combination with actuating mechanism located at the side of the machine and gathering-arms conducting the corn to the front of the elevator, whereby contact between the growth and rotating parts of the machine is avoided, substantially as specified.

13. In a corn-harvester having supporting-wheels B B, a series of moving picker-heads striking the ears from below and stripping the stalks by an upward raking motion and receiving motion from the supporting-wheels, and a series of downwardly-acting stalk-detainers, the combination, with such pickers and stalk-detainers, of the roller O, loosely jointed to the harvester and located in the rear of the detainers, substantially as set forth.

14. In a corn-harvester having supporting-wheels B B and a series of moving picker-heads striking the ears from below and stripping the stalks by an upward motion, said heads receiving motion from said supporting-wheels, the combination, with such picker-heads, of a roller O, loosely joined to the harvester, so it may ride over the unevennesses of the surface and engage the stalks near the ground, substantially as specified.

15. The combination, with the picker-heads having the slotted teeth, of the curved pieces D, having the ribs $d'$, substantially as specified.

16. In a corn-harvester, an ear-picking elevator consisting of picker-heads and the chains to which such heads are immovably attached at each end, the heads having teeth $k$ and channels $k'$ between the same, and the attachment thereof to the chains being located in a plane about midway between the inner and outer ends of said channels and as nearly as may be in the line of the strain, substantially as specified.

SIDNEY M. STEVENS.
GEORGE A. HARVEY.

Witnesses:
THOS. H. FULLER,
CHARLES H. SALISBURY.